(12) United States Patent
Bullock, IV et al.

(10) Patent No.: US 6,562,203 B1
(45) Date of Patent: May 13, 2003

(54) ELECTROCHEMICAL MACHINING APPARATUS INCORPORATING A MECHANISM FOR MAINTAINING A UNIFORM ELECTROLYTE FLOW GAP

(75) Inventors: Jonathan S. Bullock, IV, Oak Ridge, TN (US); Joseph T. Fisher, Knoxville, TN (US); James D. Hensley, Knoxville, TN (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 06/534,876

(22) Filed: Sep. 8, 1983

(51) Int. Cl.[7] ............................................... C25D 17/00
(52) U.S. Cl. ................................................. 204/224 M
(58) Field of Search ........................... 204/129.5, 129.6, 204/224 M

(56) References Cited

U.S. PATENT DOCUMENTS 3,900,374 A * 8/1975 Haggerty ........... 204/224 M X
4,147,609 A * 4/1979 Suslin et al. ........... 204/224 M
4,202,739 A * 5/1980 Csakvary et al. ... 204/224 M X

* cited by examiner

Primary Examiner—Charles T. Jordan
(74) Attorney, Agent, or Firm—Esther L. Roberts; Emily G. Schneider; Paul A. Gottlieb

(57) ABSTRACT

The present invention is directed to an improved mechanism for use in electrochemical machining cells for maintaining an essentially constant and uniform electrolyte flow gap around the tool during displacement of the tool into a workpiece to be electrochemically machined. The mechanism of the present invention is particularly adapted for use with tools having configured surfaces such as tapered sidewalls which would form gaps of nonuniform size with the workpiece during machining which would result in nonuniform flow of electrolyte and other deleterious operating conditions. The mechanism of the present invention is a movable plate arrangement disposed contiguous to the tool to provide an essentially constant and uniform-sized gap thereabout. As the tool is displaced into the workpiece, a cam associated with the tool contacts the plate to displace a section thereof in a direction orthogonal to the movement of the tool so that as the tapered section of the tool passes the plate, the plate is moved to maintain the gap at a constant size between the plate and the tool for assuring uniform electrolyte flow around the tool during the machining operation.

4 Claims, 2 Drawing Sheets

ELECTROCHEMICAL MACHINING APPARATUS INCORPORATING A MECHANISM FOR MAINTAINING A UNIFORM ELECTROLYTE FLOW GAP

BACKGROUND OF THE INVENTION

The present invention relates generally to electrochemical machining, and more particularly to a mechanism for use in combination with an electrochemical machining cell which is capable of maintaining a uniform electrolyte flow gap between a contoured tool and the workpiece for electrochemically machining contoured surfaces in the workpiece. This invention was made as a result of work under contract W-7405-ENG-26 between the Union Carbide Corporation, Nuclear Division, and the United States Department of Energy.

Electrochemical machining is used for finishing articles or workpieces to size and shape by removing material from the selected surfaces of the workpiece without applying mechanical and/or abrasive forces to the surfaces of the workpiece. This type of material removal is especially desirable for finishing surfaces of workpieces formed of material sensitive to stresses induced by conventional machining and/or grinding operations and also for completing shapes that cannot be readily formed by employing the circular and linear motions of a cutting tool or grinding wheel.

In an electrochemical machining apparatus an electrolytic cell is formed between the workpiece-anode and a movable tool-cathode. A suitable electrolyte is circulated between the tool and the surface of the workpiece to remove material that has been electrolytically dissociated from the surface of the workpiece into the circulating electrolyte in accordance with Faraday's Law. In such electrochemical machining operations, an electrolyte flow gap or distance usually in the range of about 0.003 to 0.015 inch is maintained between the tool and the surface of the workpiece for the circulation of the electrolyte and for establishing the electrolytic cell for effecting material removal.

In order to provide an efficient electrochemical machining operation, the gap between surfaces of the movable tool and the article must remain essentially constant and uniform through the machining operation so as to provide for the efficient removal of material from the workpiece surfaces. However, in the machining of certain geometries the surface of the workpiece and the tool may be somewhat skewed in relation to the motion of the tool. In such instances, the gap between the surfaces of the workpiece and the tool will be uneven at various locations around the tool so as to effect nonuniform flow and/or distribution of electrolyte through the gap. The electrolyte will flow along the path of the least resistance with the wider portions of the gap receiving a larger volume of the electrolyte. An insufficient volume of electrolyte flowing through a relatively small gap will deleteriously hamper the machining operation since the flow of electrolyte may be insufficient for disipating heat generated by the machining current and for washing away dissolved material from the workpiece surface. Also, arcing could occur between the tool and the workpiece because of inadequate cooling in the machining zone by the electrolyte and further, the tool could contact a surface of the article near the small gap so as to short-out the electrochemical cell. An example of such a machining operation where the electrolyte-flow gap is not uniform is where a preformed cavity in a workpiece is to be electrochemically formed with a contour wherein a sidewall is tapered while a complementary sidewall is straight. To effect this machining operation the tool must be provided with a tapered sidewall which is also tapered relative to the axis of motion for the tool. As the tool approaches the cavity to effect the machining operation a relatively small gap will be formed between the straight side of the tool and the edge of the workpiece adjacent to the cavity which is a normal gap for initiating the electrochemical machining operation. However, because of the taper an excessively large gap will be formed between the tapered side of the tool and the edge of the cavity. With this arrangement the electrolyte flow will be excessively nonuniform so as to cause the aforementioned machining problems.

The problems associated with the nonuniform distribution of the electrolyte between the movable tool and the surfaces of the article being electrochemically machined may be alleviated by positioning a sacrificial slave plate on the surface of the article. Such a slave plate is formed of a material electrochemically dissoluble and is provided with an opening that is of an width desired of the gap between the machine tool and the workpiece so as to create a uniform gap around the tool. With such slave plate in place the electrolyte is uniformly distributed through the gap of a relatively constant size created between the slave plate and the tool while the slave plate is electrochemically machined at a rate comparable with the machining rate of the workpiece. By electrochemically machining or dissolving the slave plate a constant gap is maintained as the tool penetrates the article being machined. While the use of a slave plate overcomes the problems associated with a nonuniform distribution of the electrolyte between the article being machined and the movable tool the sacrificial slave plates are frequently complex structures and add significantly to the fabrication costs of the articles being machined. Additionally, the material dissolved from the slave plate may be deleterious to the operation of the overall process.

SUMMARY OF THE INVENTION

Accordingly, it is the primary aim or objective of the present invention to provide a reusable mechanical mechanism capable of maintaining a constant uniform gap between the movable tool and the edges of the mechanical mechanism so as to provide electrolyte flow at an essentially constant and uniform rate at all points around the tool during the electrochemical machining operation. Generally, the electrochemical machining apparatus for providing this mechanism is utilized particularly for forming contoured cavities in the workpiece defined by a tapered sidewall and a complementary essentially straight sidewall. The apparatus comprises a housing for supporting a workpiece having a cavity forged or otherwise formed therein to be finished to size or contoured by electrochemically machining. An elongated tool means is longitudinally displaceable within the housing and is adapted to be received within the cavity of the workpiece. The tool means is provided with a relatively straight sidewall and also a tapered sidewall conforming to the contour desired of a cavity. A plate means of electrically insulating material is disposed in the housing at a location contiguous with the surface of the workpiece and is formed of a movable section and a stationary section. The plate means is provided with an opening therethrough which is in registry with the cavity with a portion of a movable plate means projecting over a portion of the cavity to provide an electrolyte-flow gap between the tapered sidewall of the tool means and the edge of the movable section of the plate means corresponding in size to the electrolyte gap between the relatively straight sidewall of the tool means and the edge of a stationary section of the plate means overlying the upper-most end of the workpiece when the tool means is displaced to a location adjacent the plate means. Cam means are operatively associated with the tool means and the movable plate means for displacing the latter in a direction orthogonal to the displacement of the tool means to provide and maintain the gap between the plate means and the tool means at a size corresponding to the gap between the relatively straight sidewall of the tool means and the wall of the cavity adjacent thereto as the tool means are displaced into the cavity. By employing the movable plate mechanism of the present invention, the gap between the tapered tool and the workpiece remains essentially constant and uniform at all points around the workpiece so as to assure uniform flow of the electrolyte during the machining operation. This mechanism provides for the machining of relatively complex contours in crucibles to be effected without encountering the aforementioned nonuniform flow difficulties or the utilization of the expensive and/or troublesome sacrificial slave plates heretofore required.

Other and further objects of the invention will be obvious upon an understanding of the illustrative embodiment about to be described or will be indicated in the appended claims, and various advantages not referred to herein will occur to one skilled in the art upon employment of the invention in practice.

Figure 1:
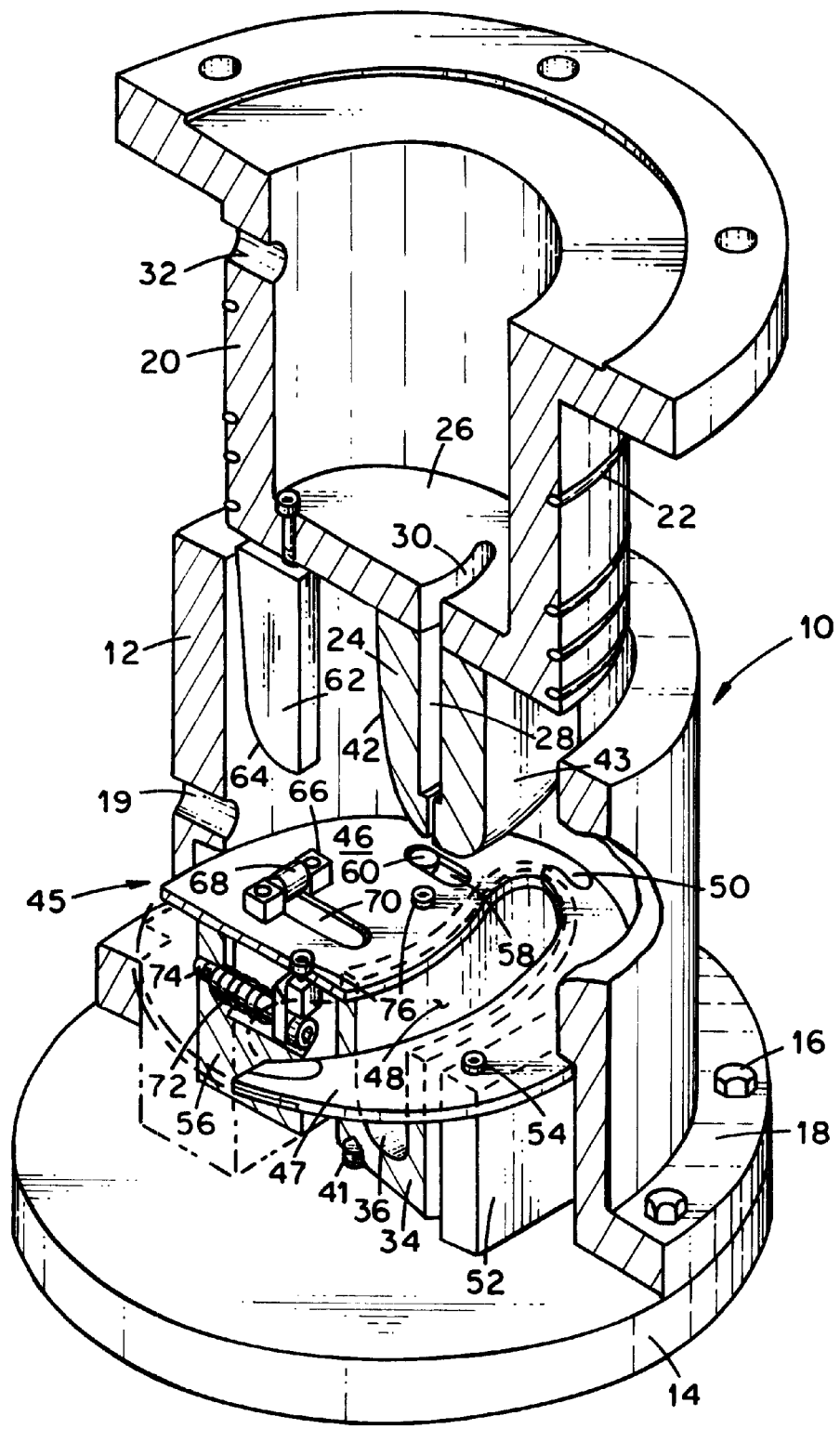
FIG. 1 is an elevational view, partly broken away, showing details of the movable plate mechanism of the present invention within an electrochemical machining cell.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

DETAILED DESCRIPTION OF THE INVENTION

As shown in the accompanying drawings, an electrochemical machining cell or fixture 10 comprises a housing 12 shown in the form of an open cylinder which could be rectangular, square or any other suitable open configuration. The housing 12 is preferably formed of an electrical insulating material or insulated at appropriate places therein so as to provide appropriate couplings between the cathode tool and the anode workpiece. The housing 12 is attached to a base 14 in the fluid-type relationship to provide a closed bottom to the housing 12. This base 14 may be attached by bolts 16 through a flange 18 about the lower end of the housing 12. The base plate 14 may be formed of electrical insulating material or be provided with an electrical insulator for supporting the workpiece in a nonconducting manner with the housing 12. An opening 19 is in the housing 12 for admitting electrolyte from a suitable source under a pressure of about 100 to 200 psig into the housing interior. While one opening is shown several openings similar to 19 may be disposed about the periphery of the housing.

Within the housing 12 is disposed a tool holder 20 shaped in the form of a hollow piston which is of a diameter slightly less than the diameter of the opening into the housing and is longitudinally displaceable within the housing. Seals 22 such as O-rings are disposed about the tool holder 20 for maintaining a fluid seal about the tool holder 20 as the tool holder 20 is displaced into the housing. The tool holder 20 supports an elongated tool 24 formed of a suitable metal such as copper with the tool 24 projecting from the lower surface or base 26 of the tool holder 20. This elongated tool 24 is coupled to the suitable electrical supply (not shown) to provide the cathode in the electrochemical machining operation. A longitudinal passageway 28 is provided through the tool to form a flow path for the electrolyte from within the housing 12 through the tool 24 and an appropriately configured opening 30 in the base 26 of the tool holder 20 and out an openings 32 (only one shown) in the sidewall of the tool holder 20 for completing the flow path of the electrolyte.

Figure 3:
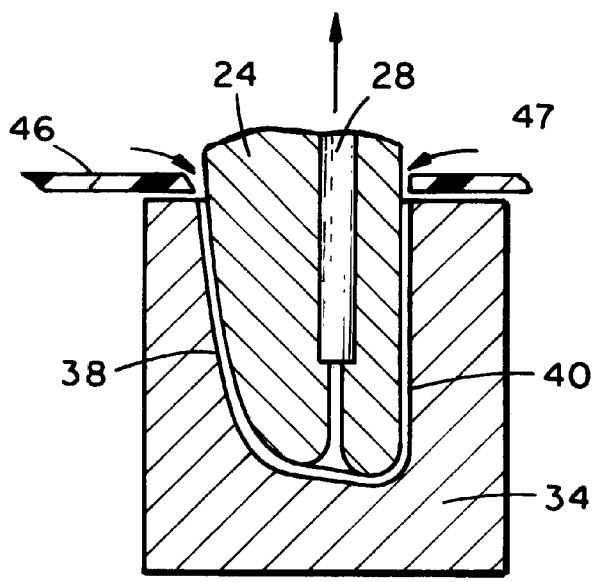
FIG. 3 is a view corresponding to that of FIG. 2 but with the tapered tool having progressed into the cavity and the movable plate displaced in a direction orthogonal to the direction of movement of the tapered tool to maintain the gap between the tool and the workpiece at an essentially constant and uniform size.

A workpiece 34 is disposed in the housing 12 on the base 14 and is coupled to a suitable power supply (not shown) to provide the anode in the electrochemical milling operation. The workpiece 34 is shown as a generally arcuate shape but could be of any suitable shape and is provided with a cavity 36 which is to be electrochemically machined. The cavity 36 within the workpiece is initially formed by conventional forging operations and is provided with inwardly converging sidewalls. These forged sidewalls are electrochemically machined to provide a tapered sidewall 38 and a straight sidewall 40 as shown best in FIG. 3. The workpiece 34 may be fixed in the housing 12 in any suitable manner such as by attaching it to the base 14 by a suitable bolt arrangement as generally shown at 41.

In order to machine the workpiece 34 to provide the cavity 36 with the tapered sidewall 38 and the straight sidewall 40, the tool 24 is provided with a tapered sidewall 42 and a straight sidewall 43. As this tool 24 is inserted into the cavity 36 the spacing between the tool 24 and the workpiece effects the electrochemical machining of the workpiece 34 in the contour dictated by the configuration of the tool 24.

Figure 2:
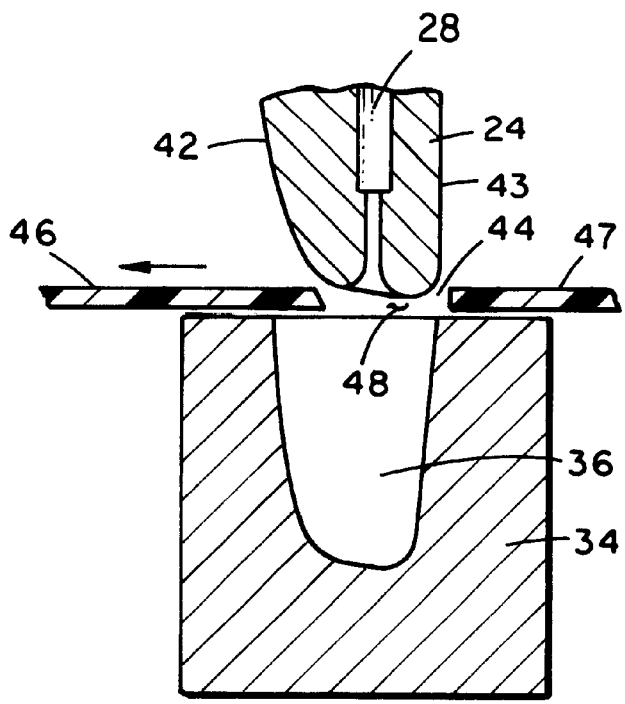
FIG. 2 is a schematic sectional view showing the relative position of a tapered tool means and the workpiece with the movable plate of the present invention disposed therebetween to provide the essentially constant and uniform electrolyte-flow gap between the tool and the edges of the movable plate.

In accordance with the present invention, the electrolyte flow into the cavity 36 from within the housing is maintained at a constant rate about all portions of the tool 24 by assuring that the gap 44 about the tool 24 is maintained at an essentially constant and uniform size during the machining operation. To provide this uniform flow of electrolyte in accordance with the present invention, a two-piece plate 45 is disposed at a location within the housing 12 contiguous to the workpiece 34 and at an angle orthogonal to the direction of displacement of the tool 24. The plate 45 may be of a thickness of about 0.25 inch and is formed of a suitable electrical insulating material such as glass fibers in a resin matrix which is not decomposable by the electrolyte. The two-piece plate 45 is provided with a movable section 46 and a stationary section 47 and is provided with an opening 48 in the plate in a configuration similar to that of the cavity 36 within the workpiece 34. The movable section 46 of the two-piece plate 45 is displaced to maintain the gap 44 between the tool 24 and the plate 45 at a constant size during displacement of the tool 24 into the cavity 36 of the workpiece 34. In the initial position of the two-piece plate 45 when the tool 24 is at a location contiguous to the workpiece 34 as it would be at the start of electrochemical machining operation as in FIG. 2, a portion of a movable plate section 46 overlies the cavity 36 of the workpiece 34 and terminates at a location near the surface of the tool so as to provide a gap corresponding to that provided by the stationary section 47 of the plate means 45. If desired, the edge of the movable plate section 46 may be provided with a slight taper to facilitate electrolyte flow through the gap 44. As shown, the edge of the stationary section 47 of the plate 45 is close to the edge of the cavity 36 so that as the tool 24 is displaced thereinto, the gap 44 provided by the stationary edge and that of the stationary plate section 47 and the movable section 46 of the plate 45 is of a uniform size. The plate sections 46 and 47 are preferably coupled by a suitable tongue-and-groove or lap joint as generally shown at 50 so as to assure that excessive electrolyte will not flow passed the ends of the plate sections as the movable plate section 46 is moved away from its initial position during the displacement of the tool 24 into the workpiece cavity 36. The stationary or fixed section 47 of the two-piece plate 45 is supported on the base 14 of the housing by a support 52. Bolts for this holding the plate section 47 in position are shown at 54. A support 56 is also disposed on the base 14 for supporting the movable section 46 of the plate 45 but in a manner so that relative motion may occur therebetween. To provide this relative movement the movable section 46 of the plate 45 is provided with two slots 58 (one of which is shown) with these slots extending in a direction desired of plate displacement. These slots 58 guide the plate section 46 in the desired direction during the displacement of the tool 24. Rods 60, one of which is shown in slot 58, extend through the slots 58 to provide the coupling between the support 56 and the plate section 46 and the alignment of the plate section 46 as it is displaced during the machining operation.

In order to displace the movable section 46 of the plate 45 in a direction orthogonal to the tool displacement during the machining operation in such a manner as to maintain an essential constant and uniform gap 44 between the edge of the plate 45 and the tool 24 about the entire periphery thereof, a cam 62 is affixed to the base 26 of the tool holder 20 at a location spaced from the tool 24. This cam 62 is of an elongated configuration provided with a tapered sidewall 64 corresponding in length and shape to the tapered sidewall 42 of the tool 24. A cam follower 66 is provided in the movable plate section 46 for receiving the cam 62 to effect the displacement of the plate section 46 as the cam 62 contacts the cam follower 66 and forces the plate section 46 to move in a direction orthogonal to the displacement of the tool 24 a distance corresponding to the increasing width of the tapered tool 24 as it enters the cavity 36 in the workpiece 34. The cam follower 66 may be provided with a roller arrangement 68 to facilitate movement and minimize wear on the cam follower. A slot 70 is provided in the movable plate section 46 for receiving the cam 62 as it is displaced into the cam follower 66.

As the tool holder 20 is moved longitudinally into the housing 12 by a suitable press or other device, the cam 62 engages the roller 68 of the cam follower 66 to move the movable plate section 46 away from the cavity of the workpiece so as to allow the tool 24 to enter the cavity 36 of workpiece 34 while maintaining an essentially constant and uniform sized gap 44 between the edge of the movable plate section 46 and the tapered sidewall 42 of the tool 24 corresponding to the size of the gap 44 provided by the stationary plate section 46 and the straight sidewall 43 of the tool 24.

Bias means such as compression springs 72 (one of which is shown) are supported on a suitable screw or rod 74 on opposite sides of the cam follower 66 for returning the movable plate section 46 to its original position when the cam 62 is withdrawn from the cam follower 66. These springs 72 are coupled to the movable plate section 46 by a suitable retaining mechanism as the bolt arrangement shown at 76.

In a typical machining operation a workpiece of uranium alloy with a forged cavity 36 is positioned in the electrochemical machining fixture 10 with the cavity 36 directly in longitudinal alignment with the tapered tool 24. The edges of the two-piece plate 45 are adjusted to form an electrolyte flow gap of approximately 0.004 inch between the plate and the sides of the tapered tool 24. The tool 24 is then displaced into the cavity 36 for effecting electrochemical machining operation. The electrolyte which contains about 270 to 360 grams of sodium nitrate per liter of solution is introduced into the housing 12 through openings 19 at a flow rate of about 830 liters per minute at a temperature of about 80 to 100° F. and at a pressure of 100 to 200 psig. A current density of about 1,000 amperes per square inch is used in the electrolytic cell at a voltage of 9 to 15 volts dc to effect a material removal rate of about 1 cubic inch per 1,000 ampere-minutes. The walls of the cavity were machined to dimensional tolerances of ±0.02 inch and to surface finishes in the range of 16–64 micro-inches. No significant deterioration occurred in the movable plate mechanism during multiple operations of this type to indicate the reusability of the plate mechanism in repeated machining operations.

It will be seen that the present invention provides a mechanism for providing uniform flow of electrolyte between a tool and a workpiece during electrochemically machining operations where the workpiece and tool are so configured that nonuniform flow of the electrolyte would occur without the addition of the present invention.

What is claimed is:

1. An electrochemical machining apparatus for providing a contoured cavity in a workpiece defined by a tapered sidewall and essentially straight complementary sidewall, comprising:

a housing for supporting a workpiece having a cavity therein to be contoured by electrochemical machining;

elongated tool means longitudinally displaceable within said housing and adapted to be received in the cavity of said workpiece, said tool means having a relatively straight sidewall and a tapered sidewall conforming to the contour desired of said cavity;

plate means of electrically insulating material disposed in said housing at a location contiguous to the end of the workpiece and in a plane orthogonal to the direction of displacement of said tool means with said plate means being formed of a movable section and a stationary section, said plate means having an opening therethrough in registry with said cavity with a portion of the movable section of said plate means projecting over a portion of said cavity to provide an electrolyte flow gap between the tapered sidewall of the tool means and the edge of the movable section of the plate means corresponding in size to the electrolyte flow gap between the relatively straight sidewall of the tool means and the edge of the stationary section of the plate means overlying the end of the workpiece when said tool means are displaced at a location adjacent to said plate means; and cam means operatively associated with said tool means and said movable section of the plate means for displacing the latter in the direction orthogonal to the displacement of said tool means to provide and maintain the gap between the plate means and the tool means at an essentially constant and uniform size as the tool means are displaced into said cavity.

2. The electrochemical machining apparatus claimed in claim 1 wherein said tool means are carried on the face of a piston means receivable in said housing, and wherein said cam means comprises an elongated cam carried on the face of the piston at a location adjacent to said tool means with said cam means having a wall surface thereon tapered to correspond with the tapered sidewall of said tool means and cam follower means carried by said plate means for receiving said elongated cam in a contacting relationship with the tapered wall surface of the cam to effect the displacement of the movable section of said plate means.

3. The electrochemical machining apparatus as claimed in claim 2 wherein spring means are disposed between said housing and said plate means for resisting the displacement of said plate means by said cam means and for returning said plate means to said location.

4. The electrochemical machining apparatus as claimed in claim 3 wherein said tool means has a vertical passageway therethrough, and said housing has an opening therethrough above said plate means for conveying electrolyte into said housing and sequentially through said cavity and said passageway.

* * * * *